W. E. BAILEY.
GARDEN TOOL.
APPLICATION FILED JULY 30, 1918.
1,299,417.
Patented Apr. 8, 1919.
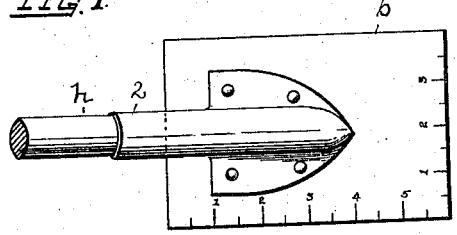
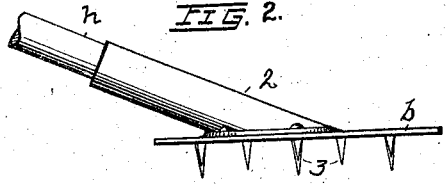
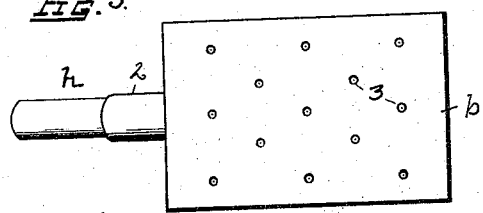
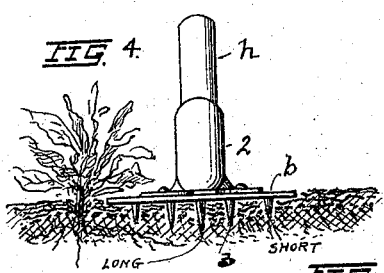
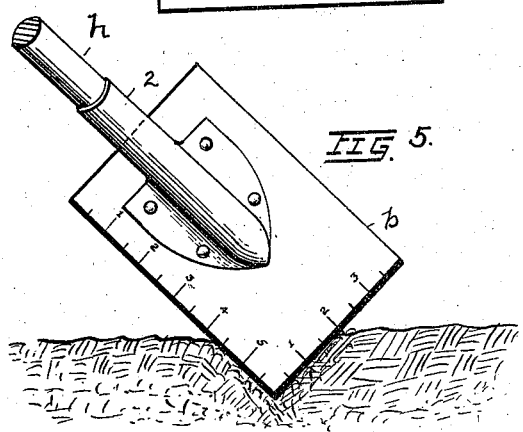
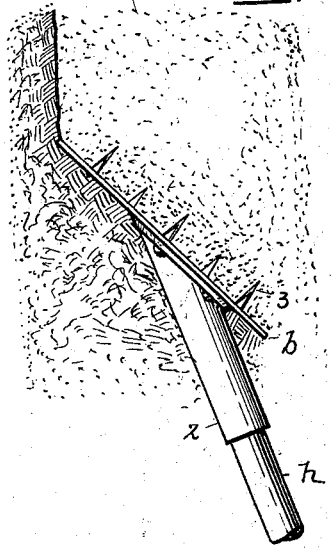
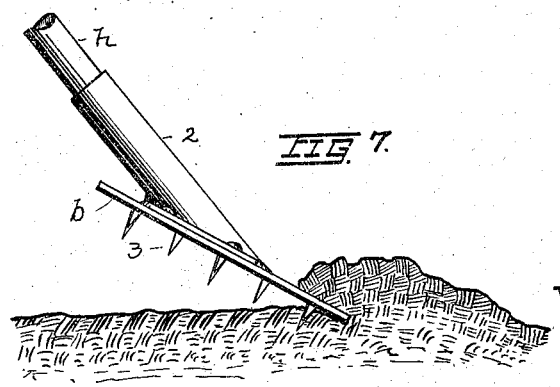
Witness
Geo. E. Kricker.
Inventor
Wm E. Bailey.
By Fisher &c.
Attorneys

UNITED STATES PATENT OFFICE.

WILLIAM ELMER BAILEY, OF COLUMBUS, OHIO.

GARDEN-TOOL.

1,299,417.

Specification of Letters Patent. Patented Apr. 8, 1919.

Application filed July 30, 1918. Serial No. 247,363.

*To all whom it may concern:*

Be it known that I, WILLIAM ELMER BAILEY, a citizen of the United States, residing at Columbus, in the county of Franklin and State of Ohio, have invented certain new and useful Improvements in Garden-Tools, of which the following is a specification.

This invention pertains to a new and original style or kind of garden tool adapted to be used in the preparation of the soil for seed and plants and in the subsequent cultivation of the garden as hereinafter fully described and particularly set forth in the claim.

In the accompanying drawings, Figure 1 is a plan view of the tool or implement and Fig. 2 is a side or edge view thereof. Fig. 3 is a bottom view and Fig. 4 a front elevation shown as in cultivating relations with a row of plants. Fig. 5 shows the tool as it is used in scoring or marking the soil for seeding or setting plants, and Fig. 6 shows the tool as it may be employed to bank up loose soil to a row of plants. Fig. 7 shows the tool as it may be used to lift earth, something like a spade or shovel.

Still other illustrations of ways in which this tool can be used might be given, as, for example, in measuring spaces between rows for sowing seeds, or setting plants and serving as a garden rule for all such purposes. Otherwise, the tool shown may be variously designated according to its evident adaptability, such as earth hand cultivator, soil pulverizer, weeder, and clod crusher.

Structurally, the invention is comprised in a rectangular metallic plate shaped body of cast or sheet metal and of the definite size of four inches in width and six inches in length and marked with a scale of inches and fractions thereof at its edges. Both scales are found useful in such an implement for spacing distances between rows and for setting plants in rows and to insure economy of space and attractive appearance, and the same object is measurably obtained by making the body *b* exactly six inches long by four inches wide, and the respective straight edges also have their special use or function as partially illustrated in Figs. 5 and 6. Thus, in Fig. 5 a position of the tool is shown whereby the soil can be scored to greater or less depth for planting seeds or setting plants and in which a stretched line may serve as a guide for its use, while in Fig. 6 the illustration is designed to show its use in drawing loose earth up to the plants after the manner of a scraper. The handle *h* is purposely set at an inclination to the blade or plate *b* in the fixed socket 2, as shown, and lengthwise thereof so that one can use the tool without stooping or bending the body.

The body as thus constructed is provided with a series of teeth 3 variously scattered over its bottom and which may be cast with the body *b* or, as an equivalent thereof, be struck from the body if it be made of suitable sheet metal. The said teeth are comparatively short, say from an inch or over in length along the middle and graduated to about half that length along the sides of the tool, and may be of any suitable or preferred shape, the idea being that teeth thus constructed and arranged are particularly serviceable in eradicating small weeds by scarifying the earth, and by working the tool back and forth it also loosens and pulverizes the earth to as great a depth as is desirable in an otherwise properly prepared garden. Such cultivation and pulverization of the soil produces a mulsh which contributes to the growth of plants conserving moisture regardless of rains or artificial moistening. If the tool be used as soon as it should be there will be no weeds growing, and the labor of keeping up the garden will be proportionally lessened to the manifest advantage of the growing plants.

In use for these purposes the tool is worked back and forth without lifting while the user stands practically erect, and the best plan is to work backward so as not to tramp on the soil that has been worked. This makes gardening a pleasurable task and the work is so easy that it can be done by a woman of little strength or even by a child without tiring.

In this connection I wish especially to emphasize the advantage of the tool in the cultivation of plants with leaves or foliage that spreads laterally near the ground, as illustrated in Fig. 4, and of this character I may mention beets, strawberries, cabbage and other garden plants as well as many kinds of flowers, and under which weeds and grass readily germinate. This is wherein the short teeth are especially useful and safe because they can be run under the leaves close to the plant without disturbing its roots and at the same time destroy the objectionable growth. Note, too, that this is done without removing the soil from about the plant as is done by cutting out with a hoe.

Finally, this tool is excellently adapted to crushing clods, and it may be employed to strike the clods directly with the teeth in a downward blow or with the edge of the tool for splitting and breaking the larger clods. Indeed there are many uses to which this tool is admirably adapted and which so far as I know and believe, are not performed by any other single tool known to this art.

Attention is directed to the fact that the blade is thin and entirely flat with its side and end cutting edges straight, in order that all edges, both the side and end edges, can be used for cutting the ground and pushing it toward or away from the operator under various conditions. Furthermore, the corners of the blade form sharp right angles for purpose of chopping the ground and vegetation, and each of the four corners can be used by turning the handle to different positions, it being noted that said handle member is attached to the back of the blade in the longitudinal center line at an acute angle therewith in order that when the handle is turned around its axis, this brings the different edges and corners of the blade into play to advantage. Attention is also directed to the fact that the teeth are shorter along the side edges and longer along the longitudinal center line of the blade, thus permitting of freer use of the side edges of the blade and providing only slight agitation of the ground by the teeth along the side edges of the blade and greater agitation along the longitudinal center line. The side edges of the blade can thus be used for cutting and chopping the ground close to the plants without injuring the roots, and by moving the blade longitudinally between the rows of plants with the side edges of the blade running close to the plants, this will agitate the ground in an especially desirable manner, the ground being pulverized close to the plants, but at less depth than midway between the rows, thus tending to make a furrow between the rows of plants filled with pulverized soil.

What I claim is:

A garden tool having a thin entirely flat rectangular blade with a straight side and end cutting edges and sharp right angled chopping corners, a handle member attached to the back of the blade in the longitudinal center line at an acute angle therewith, and short teeth depending from and scattered over the lower surface of the blade, said teeth being shorter along the side edges and longer along the longitudinal center line of the blade, permitting of freer use of the side edges of the blade and providing only slight agitation of the ground by the teeth along the side edges of the blade and greater agitation along the longitudinal center line.

Signed at Columbus, in the county of Franklin, and State of Ohio, this 16th day of July, 1918.

WILLIAM ELMER BAILEY.